(12) United States Patent
Yao et al.

(10) Patent No.: US 11,738,550 B2
(45) Date of Patent: Aug. 29, 2023

(54) FILM-REMOVING APPARATUS

(71) Applicant: TRIPLE WIN TECHNOLOGY(SHENZHEN) CO. LTD., Shenzhen (CN)

(72) Inventors: Shao-Feng Yao, Shenzhen (CN); Kai Liu, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 17/894,291

(22) Filed: Aug. 24, 2022

(65) Prior Publication Data

US 2023/0139292 A1    May 4, 2023

(30) Foreign Application Priority Data

Oct. 29, 2021 (CN) .......................... 202111274338.2

(51) Int. Cl.
*B32B 43/00* (2006.01)

(52) U.S. Cl.
CPC ....... *B32B 43/006* (2013.01); *Y10T 156/1168* (2015.01); *Y10T 156/1978* (2015.01)

(58) Field of Classification Search
CPC ............. B32B 43/006; Y10T 156/1168; Y10T 156/1978
See application file for complete search history.

(56) References Cited

U.S. PATENT DOCUMENTS

| | | | | |
|---|---|---|---|---|
| 5,676,789 | A * | 10/1997 | Hamamura | G03F 7/161 156/714 |
| 6,227,276 | B1 * | 5/2001 | Kim | B29C 63/0013 156/247 |
| 6,503,130 | B2 * | 1/2003 | Lim | B24B 37/34 156/716 |
| 8,756,783 | B2 * | 6/2014 | Lu | G02F 1/1309 156/247 |
| 9,102,430 | B2 * | 8/2015 | Monti | B32B 43/006 |
| 10,843,400 | B2 * | 11/2020 | Han | B32B 43/006 |
| 11,001,044 | B2 * | 5/2021 | Makino | B32B 43/006 |

FOREIGN PATENT DOCUMENTS

CN    112977987 A    6/2021

* cited by examiner

*Primary Examiner* — Philip C Tucker
*Assistant Examiner* — Nickolas R Harm
(74) *Attorney, Agent, or Firm* — ScienBiziP, P.C.

(57) ABSTRACT

A film-removing apparatus configured to remove a protecting film from a workpiece includes a supporting module configured to support the workpiece, a clamping module configured to clamp the workpiece supported by the supporting module, and a peeling module. The peeling module includes a first peeling member and a second peeling member. The first peeling member includes a bearing surface. The peeling module moves towards the clamping module to bring the bearing surface to below the protecting film, the second peeling member moves towards the protecting film to cooperate with the first peeling member in clamping the protecting member. The peeling module is then moved away from the clamping module to peel off the protecting film.

15 Claims, 10 Drawing Sheets

US 11,738,550 B2

FILM-REMOVING APPARATUS

FIELD

The subject matter herein generally relates to a film-removing apparatus during manufacture.

BACKGROUND

A workpiece can be covered by a protecting film before being machined, and the protecting film should be removed away from the workpiece. A current film-removing mechanism may be slow and not efficient in peeling off the protecting film.

BRIEF DESCRIPTION OF THE DRAWINGS

Implementations of the present technology will now be described, by way of embodiment, with reference to the attached figures.

DETAILED DESCRIPTION

Figure 1:
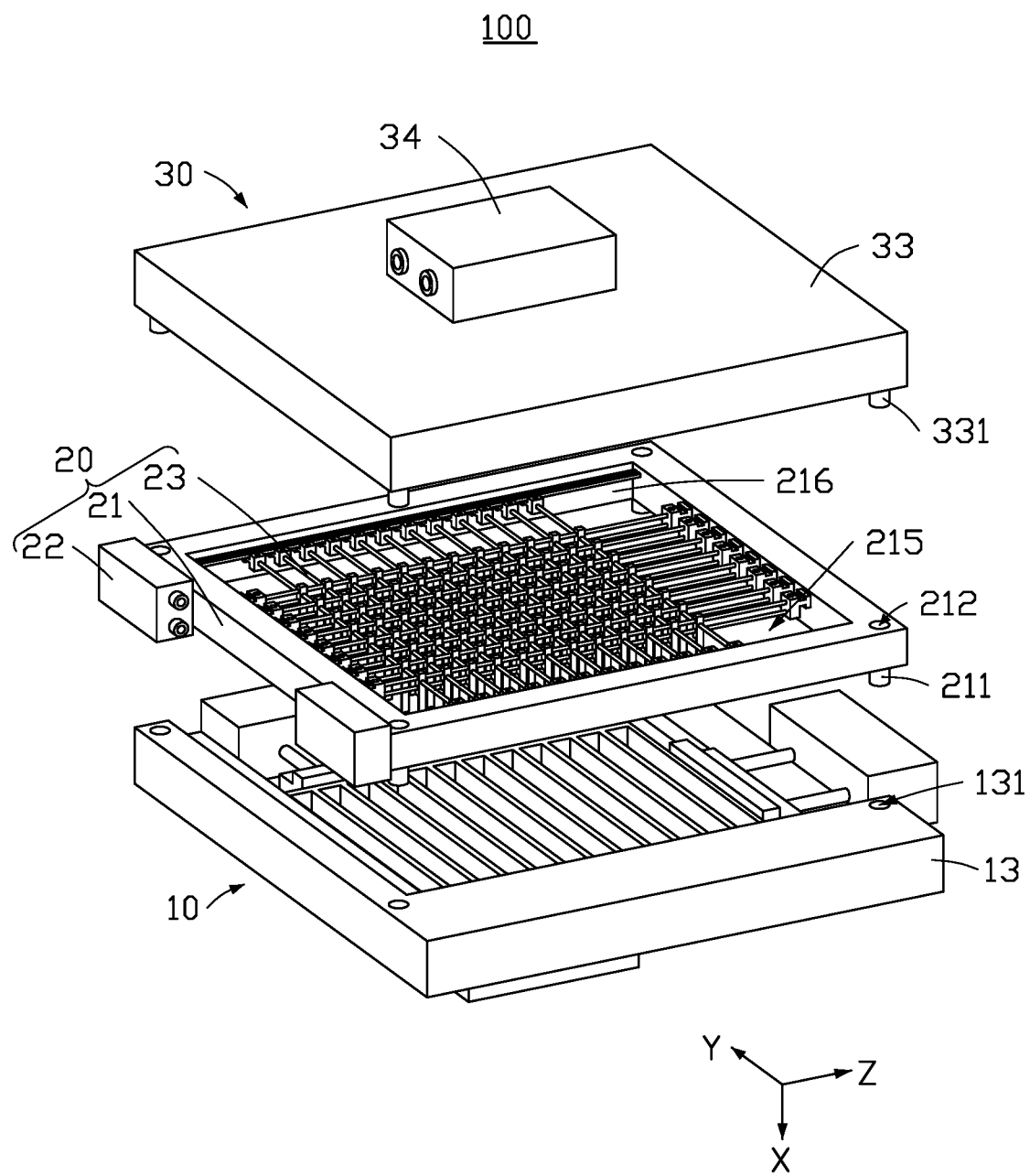
FIG. 1 is a schematic structural diagram of a film-removing apparatus according to an embodiment of the present disclosure.

The present disclosure will now be described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout.

The terminology used herein is for the purpose of describing particular exemplary embodiments only and is not intended to be limiting of the disclosure. As used herein, when a first component is referred to as "installed on" a second component, it is to indicate that the first component may be directly installed on the second component or may be indirectly installed on the second component via a third component between them. When a first component is referred to as "connecting" with a second component, it is to indicate that the first component may be directly connected with the second component or may be indirectly connected with the second component via a third component between them. When a first component is referred to as "disposed to" a second component, it is intended that the first component may be directly disposed to the second component or may be indirectly disposed to the second component via a third component between them.

Unless otherwise defined, all terms used herein have the same meaning as commonly understood by one of ordinary skill in the art to which this disclosure belongs. It will be further understood that terms such as those defined in commonly used dictionaries should be interpreted as having a meaning that is consistent with their meaning in the context of the relevant art and the present disclosure, and are not to be interpreted in an idealized or overly formal sense unless expressly so defined herein.

A film-removing apparatus configured to remove a protecting film from a workpiece is provided. The protecting film includes a first surface and a second surface which are spaced from each other in a first direction. The film-removing apparatus includes a supporting module configured to support the workpiece, a clamping module configured to clamp the workpiece supported by the supporting module, and a peeling module. The peeling module includes a first peeling member and a second peeling member. The first peeling member includes a bearing surface. The peeling module moves towards the clamping module in the first direction to cause the bearing surface to be located below the second surface, the second peeling member moves towards the first surface to cooperate with the first peeling member to clamp the protecting film, and the peeling module moves away from the clamping module in the first direction to peel off the protecting film clamped by the first peeling member and the second peeling member.

Figure 2:
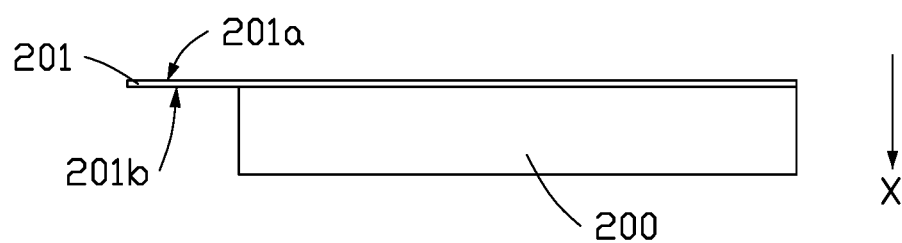
FIG. 2 is a schematic structural diagram of a workpiece with a protecting film according to an embodiment of the present disclosure.

Referring to FIGS. 1 and 2, an embodiment of a film-removing apparatus 100 configured for removing a protecting film 201 from a workpiece 200 is provided. The protecting film 201 includes a first surface 201*a* and a second surface 201*b* which are spaced from each other in a first direction X, and the film-removing apparatus 100 clamps the first surface 201*a* and the second surface 201*b* to peel off the protecting film 201. The film-removing apparatus 100 includes a supporting module 10, a clamping module 20, and a peeling module 30. The clamping module 20 is connected with the supporting module 10 and the peeling module 30. In one embodiment, the clamping module 20 is sandwiched between the supporting module 10 and the peeling module 30. The supporting module 10 is configured to support the workpiece 200. The clamping module 20 is configured to clamp the workpiece 200 to position the workpiece 200 on the supporting module 10. The peeling module 30 is configured to peel off the protecting film 201 of the workpiece 200 supported by the supporting module 10. In one embodiment, the supporting module 10 supports a plurality of workpieces 200 which are arranged in an array, the clamping module 20 clamps the plurality of workpieces 200, and the peeling module 30 peels off protecting films 201 of the plurality of workpieces 200.

Figure 3:
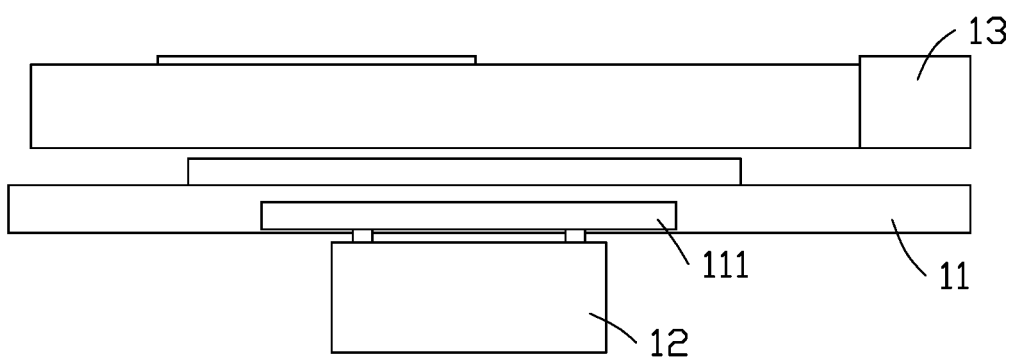
FIG. 3 is a schematic structural diagram of a supporting module of a film-removing apparatus according to an embodiment of the present disclosure.
Figure 4:
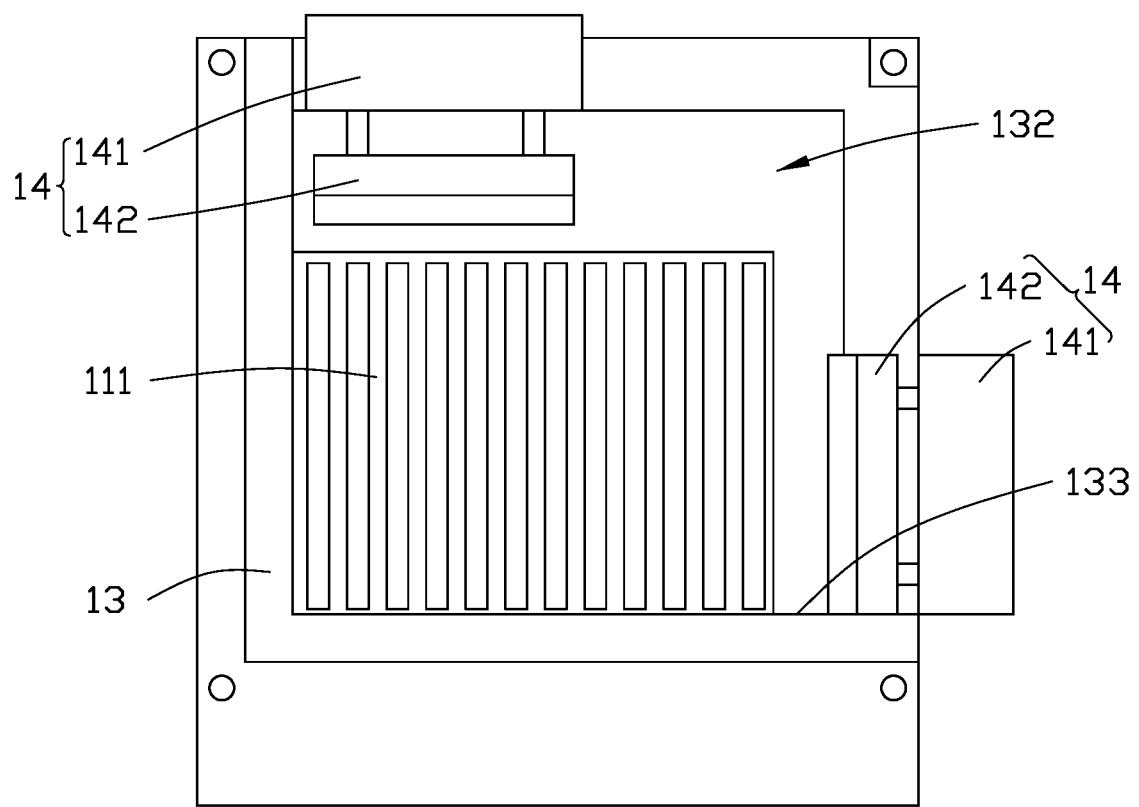
FIG. 4 is a schematic structural diagram, from another perspective, of a supporting module of a film-removing apparatus according to an embodiment of the present disclosure.

Referring to FIGS. 3 and 4, in one embodiment, the supporting module 10 includes a supporting plate 11, a first driving member 12, a first mounting plate 13, and a positioning mechanism 14. The supporting plate 11 is connected with the first driving member 12 and is configured to support a carrier 111 holding the workpieces. The plurality of workpieces may be placed on the carrier 111 in an array. The first mounting plate 13 and the supporting plate 11 are spaced from each other in the first direction X. The first mounting plate 13 defines a first opening 132 penetrating the first mounting plate 13. The first driving member 12 drives the supporting plate 11 to move towards the first mounting plate 13 in the first direction X until the carrier 111 is moved into the first opening 132 of the first mounting plate 13, then the positioning mechanism 14 holds the carrier 111 against a first side wall 133 of the first opening 132, such that the carrier 111 is positioned on the first mounting plate 13. After the protecting film is removed, the first driving member 12 drives the supporting plate 11 to move away from the first mounting plate 13 in the first direction X. In one embodiment, the first driving member 12 is a cylinder.

In one embodiment, the positioning mechanism 14 includes a second driving member 141 and a positioning block 142. The second driving member 141 is connected with the positioning block 142 and is configured to move the positioning block 142 to hold the carrier 111 against the first side wall 133 of the first mounting plate 13. In one embodiment, there are two positioning mechanisms 14, one positioning mechanism 14 is configured to position the carrier 111 in a second direction Y perpendicular to the first direction X, and the other one positioning mechanism 14 is configured to position the carrier 111 in a third direction Z perpendicular to the first direction X and the second direction Y. In one embodiment, the second driving member 141 is a cylinder.

Figure 5:
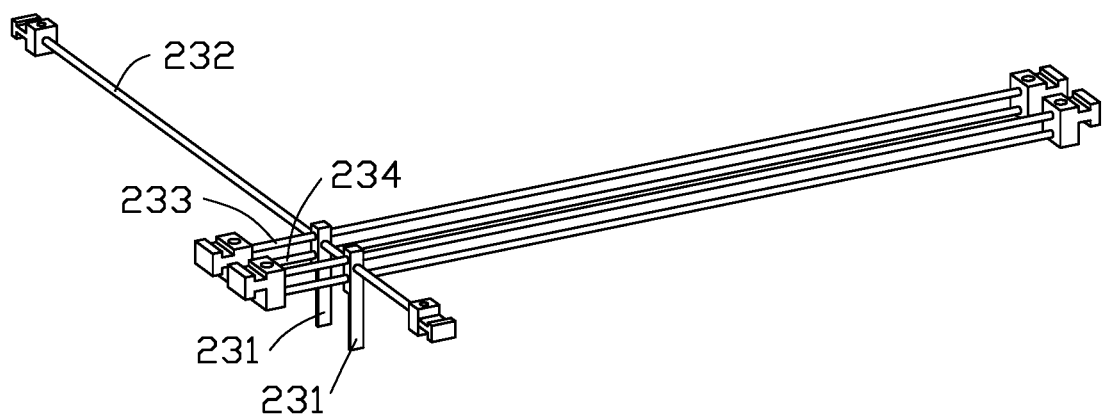
FIG. 5 is a schematic structural diagram of a clamping module of a film-removing apparatus according to an embodiment of the present disclosure.

Referring to FIGS. 1 and 5, in one embodiment, the clamping module 20 includes a second mounting plate 21, a third driving member 22, and a clamping mechanism 23. The second mounting plate 21 is connected with the first mounting plate 13. The third driving member 22 is connected with the second mounting plate 21. The clamping mechanism 23 is connected with the third driving member 22 and the second mounting plate 21. The third driving member 22 drives the clamping mechanism 23 to move on the second mounting plate 21 to clamp the workpiece.

In one embodiment, the first mounting plate 13 defines a first positioning hole 131, the second mounting plate 21 is provided with a first positioning column 211 on a side facing the first mounting plate 13, and the first positioning column 211 is accommodated in the first positioning hole 131. In one embodiment, the first mounting plate 13 defines four first positioning holes 131 on the four corners, and the second mounting plate 21 is provided with four first positioning columns 211 on the four corners.

In one embodiment, the second mounting plate 21 defines a second positioning hole 212 on a side away from the first mounting plate 13. The second positioning hole 212 matches with a second positioning column 311 of the peeling module 30.

Figure 6:
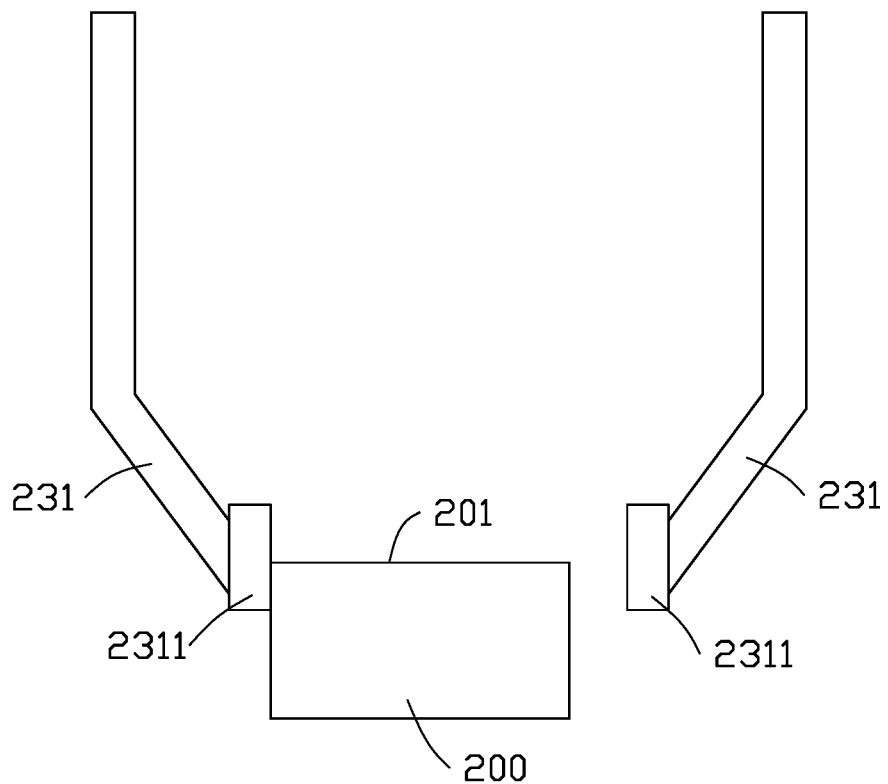
FIG. 6 is a schematic structural diagram of a clamping mechanism of a film-removing apparatus according to an embodiment of the present disclosure.

Referring to FIG. 6, in one embodiment, the clamping mechanism 23 includes at least two clamping jaws 231. Each clamping jaw 231 is provided with a first flexible layer 2311 for increasing friction with the workpiece 200. The first flexible layer 2311 may be made of polymer material. In one embodiment, the first flexible layer 2311 is a foam layer or a rubber layer.

Referring to FIGS. 1 and 5, in one embodiment, the clamping mechanism 23 further includes a first connecting rod 232, a second connecting rod 233, and a third connecting rod 234. The second mounting plate 21 further defines a second opening 215 penetrating the second mounting plate 21. The first connecting rod 232 extends along the second direction Y, and both ends of the first connecting rod 232 are detachably connected with opposite second side walls 216 of the second opening 215. The second connecting rod 233 and the third connecting rod 234 are spaced from each other in the second direction Y, and each of the second connecting rod 233 and the third connecting rod 234 extends along the third direction Z and is connected with the third driving member 22. Each of the second connecting rod 233 and the third connecting rod 234 is provided with one clamping jaw 231. The clamping jaws 231 are movably disposed on the first connecting rod 232. When the third driving member 22 drives the second connecting rod 233 and the third connecting rod 234 to move towards each other, the clamping jaws 231 move towards each other along the first connecting rod 232 to clamp the workpiece. The number of first to third connecting rods 232, 233, and 234 and number of clamping jaws 231 may be adjusted according to the number of the workpieces. In one embodiment, the third driving member 22 is a cylinder.

In one embodiment, the second connecting rod 233 is fixed on the second mounting plate 21, and the third driving member 22 drives the third connecting rod 234 to move towards or away from the second connecting rod 233.

Figure 7:
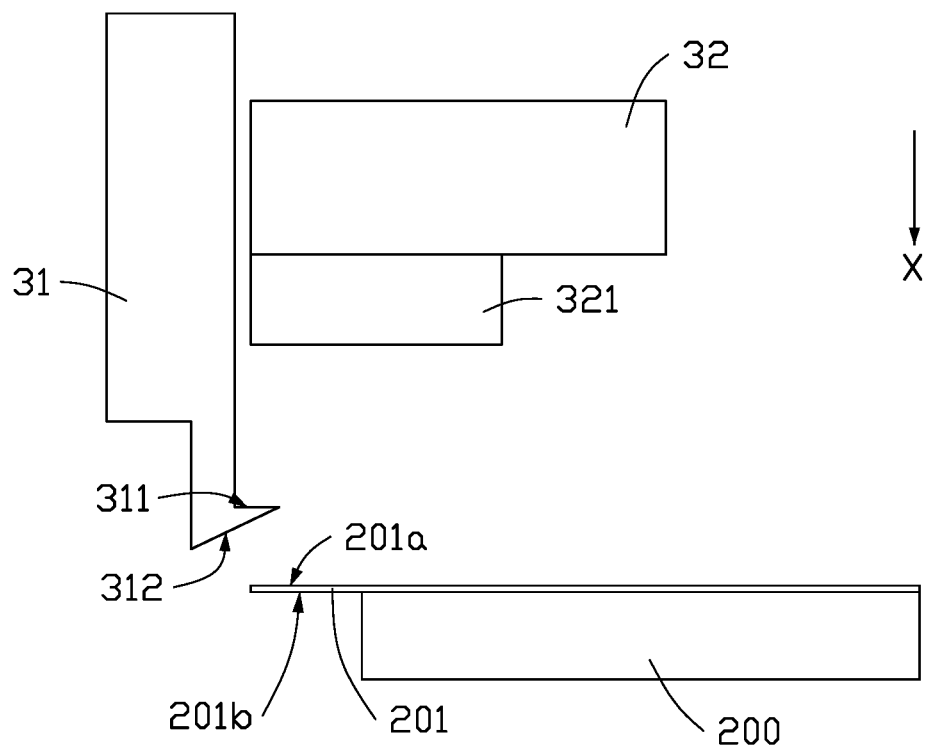
FIG. 7 is a schematic structural diagram of a first and a second peeling members of a film-removing apparatus in a first state according to an embodiment of the present disclosure.

Referring to FIGS. 1 and 7, the peeling module 30 includes a first peeling member 31 and a second peeling member 32. The first peeling member 31 includes a bearing surface 311. After the first peeling member 31 moves a certain distance along the first direction X, the first bearding surface 311 is located below the second surface 201b. The second peeling member 32 moves towards the first surface 201a and then cooperates with the first peeling member 31 to clamp the protecting film 201. After the protecting film 201 is clamped by the first peeling member 31 and the second peeling member 32, the first peeling member 31 and the second peeling member 32 move away from the workpiece 200 to peel off the protecting film 201. The first peeling member 31 and the second peeling member 32 pass through a gap between the second connecting rod 233 and the third connecting rod 234 to move towards or away from the workpiece 200.

In one embodiment, a second flexible layer 321 is disposed on a side of the second peeling member 32 in contact with the first surface 201a, to increase the friction with the protecting film 201. In one embodiment, the second flexible layer 321 includes rubber.

In one embodiment, the peeling module 30 further includes a third mounting plate 33 and a fourth driving member 34. The first peeling member 31 and the fourth driving member 34 are fixed on the third mounting plate 33. The fourth driving member 34 is connected with the second peeling member 32 and is configured to drive the second peeling member 32 to move in the first direction X. In one embodiment, the fourth driving member 34 is a cylinder.

In one embodiment, the second positioning column 331 is disposed on the third mounting plate 33. When the third mounting plate 33 is installed on the second mounting plate 21, the second positioning column 331 is accommodated in the second positioning hole 212.

Figure 8:
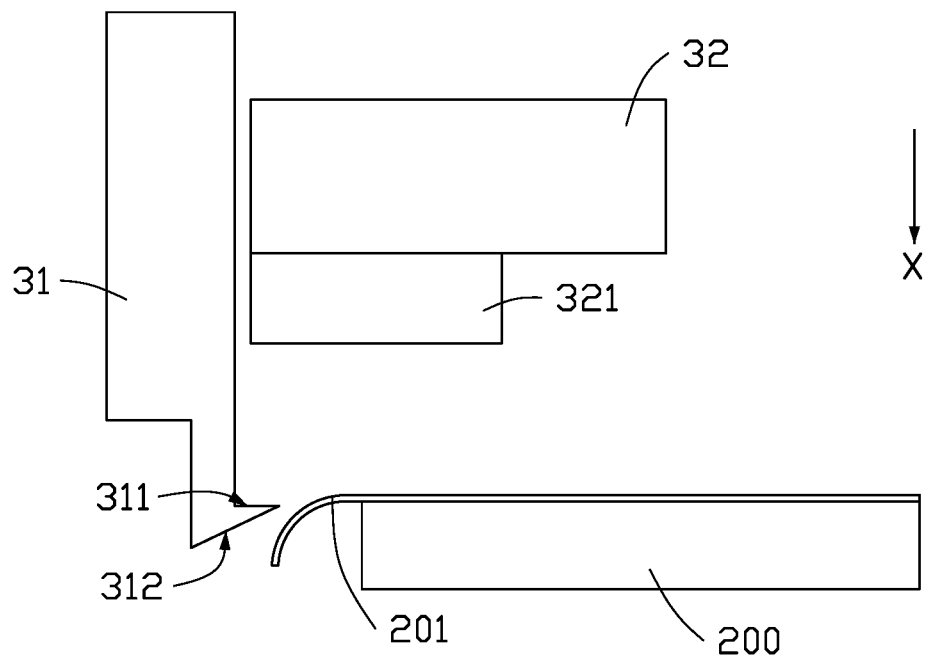
FIG. 8 is a schematic structural diagram of the first and the second peeling members of a film-removing apparatus in a second state according to an embodiment of the present disclosure.
Figure 9:
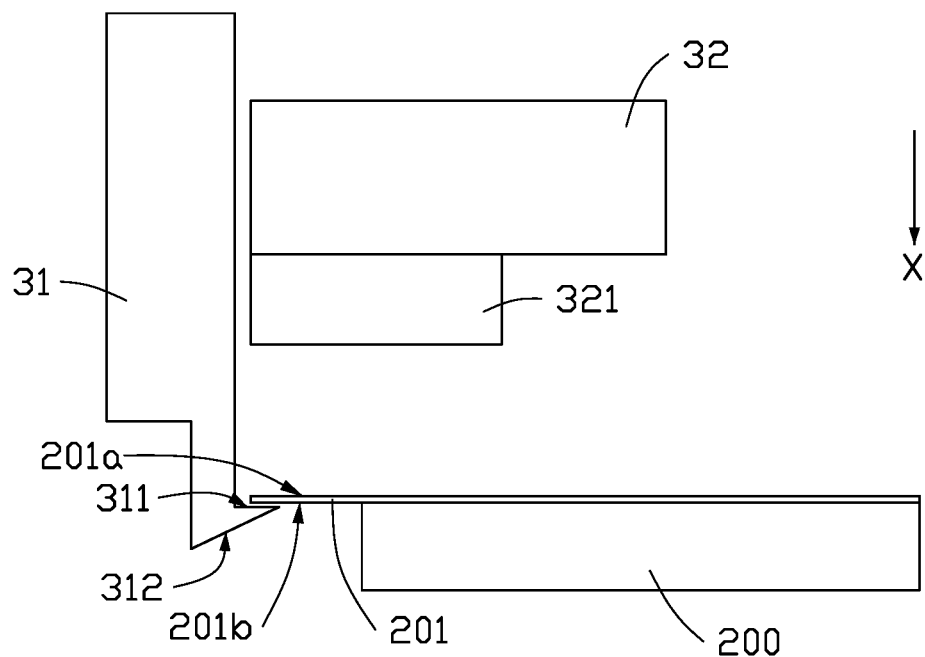
FIG. 9 is a schematic structural diagram of the first and the second peeling members of a film-removing apparatus in a third state according to an embodiment of the present disclosure.

Referring to FIGS. 8 and 9, in one embodiment, the first peeling member 31 includes an inclined surface 312 connected with the bearing surface 311. In one embodiment, the bearing surface 311 is a flat surface, and the inclined surface 312 is inclined with respect to the bearing surface 311. When the second positioning column 331 is inserted into the second positioning hole 212 to install the third mounting plate 33 on the second mounting plate 21, the inclined surface 312 presses on and bends the protecting film 201 to cause the bearing surface 311 to be located below the second surface 201b, ensuring that the first peeling member 31 and the second peeling member 32 can clamp the protecting film 201.

In one embodiment, the peeling module 30 further includes a moving part (not shown) which is connected with the third mounting plate 33 for driving the third mounting plate 33 to move in the first direction X. The moving part moves the third mounting plate 33 in the first direction X to install the third mounting plate 33 on the second mounting plate 21, the protecting film 201 is clamped by the first peeling member 31 and a second peeling member 32, then the moving part moves the third mounting plate 33 away from the second mounting plate 21. The first peeling member 31 and the second peeling member 32 move with the third mounting plate 33 to peel off the protecting film 201.

Figure 10:
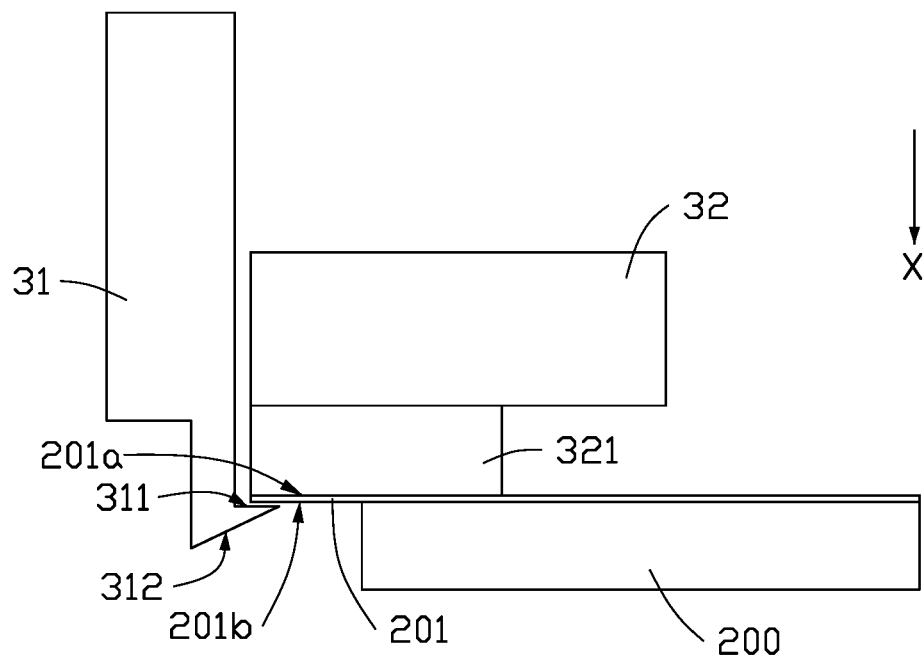
FIG. 10 is a schematic structural diagram of the first and the second peeling members of a film-removing apparatus in a fourth state according to an embodiment of the present disclosure.

Referring to FIG. 10, when in use, the carrier is placed on the supporting plate, then the first driving member drives the supporting plate to move into the first opening of the first mounting plate, the positioning mechanism holds the supporting plate against the first side wall of the first opening. Then the second mounting plate is installed on the first mounting plate, and the workpiece 200 is clamped by the clamping mechanism. Then the third mounting plate is installed on the second mounting plate, the bearing surface 311 of the first peeling member 31 being located below the second surface 201b. Then the fourth driving member drives the second peeling member 32 to move towards the workpiece 200 in the first direction X, until the second peeling member 32 cooperates with the first peeling member 31 to clamp the protecting film 201. Then the third mounting plate moves away from the second mounting plate causing the first peeling member and the second peeling member to peel off the protecting film 201.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A film-removing apparatus configured to remove a protecting film from a workpiece, the protecting film comprising a first surface and a second surface which are spaced from each other in a first direction, the film-removing apparatus comprising:
   a supporting module configured to support the workpiece;
   a clamping module configured to clamp the workpiece supported by the supporting module; and
   a peeling module comprising:
     a first peeling member comprising a bearing surface; and
     a second peeling member,
   wherein during operation, the peeling module is moved towards the clamping module in the first direction to bring the bearing surface to below the second surface, the second peeling member is moved towards the first surface to cooperate with the first peeling member to clamp the protecting film, and the peeling module is then moved away from the clamping module in the first direction to peel off the protecting film.

2. The film-removing apparatus of claim 1, wherein the supporting module comprises:
   a supporting plate configured to support a carrier holding the workpiece;
   a first driving member connected with the supporting plate;
   a first mounting plate; and
   a positioning mechanism connected with the first mounting plate, the first driving member is configured to move the supporting plate to the first mounting plate, and the positioning mechanism is configured to position the carrier on the first mounting plate.

3. The film-removing apparatus of claim 2, wherein the positioning mechanism comprises a second driving member connected with the first mounting plate and a positioning block connected with the second driving member, the second driving member is configured to move the positioning block to hold the carrier against the first mounting plate.

4. The film-removing apparatus of claim 3, wherein the first mounting plate defines an opening, the first driving member is configured to move the supporting plate to cause the carrier to move into the opening, and the second driving member is configured to move the positioning block to hold the carrier against a side wall of the opening.

5. The film-removing apparatus of claim 3, wherein the clamping module comprises:
   a second mounting plate;
   a third driving member connected with the second mounting plate; and
   a clamping mechanism connected with the third driving member and the second mounting plate, the third driving member is configured to drive the clamping mechanism to clamp the workpiece.

6. The film-removing apparatus of claim 5, wherein the first mounting plate defines a first positioning hole, a first positioning column is disposed on the second mounting plate, the first positioning column is accommodated in the first positioning hole.

7. The film-removing apparatus of claim 6, wherein the peeling module further comprises a third mounting plate and a fourth driving member, the first peeling member and the fourth driving member are fixed on the third mounting plate, the fourth driving member is connected with the second peeling member and is configured to drive the second peeling member to move in the first direction.

8. The film-removing apparatus of claim 7, wherein a second positioning column is disposed on the third mounting plate, and a side of the second mounting plate away from the first mounting plate defines a second positioning hole matching with the second positioning column; when the second positioning column is accommodated in the second positioning hole, the bearing surface of the first peeling member is located below the second surface of the protecting film.

9. The film-removing apparatus of claim 8, wherein the first peeling member further comprises an inclined surface connected with the bearing surface; when the second positioning column is inserted into the second positioning hole, the inclined surface presses on and bends the protecting film to bring the bearing surface of the first peeling member to below the second surface of the protecting film.

10. The film-removing apparatus of claim 5, wherein the clamping mechanism comprises at least two clamping jaws, the third driving member is configured to drive the at least two clamping jaws to move towards each other to clamp the workpiece.

11. The film-removing apparatus of claim 10, wherein each of the at least two clamping jaws is covered with a flexible layer.

12. The film-removing apparatus of claim 11, wherein the flexible layer comprises a rubber.

13. The film-removing apparatus of claim 10, wherein the clamping mechanism further comprises a first connecting rod, a second connecting rod, and a third connecting rod, the first connecting rod extends along a second direction perpendicular to the first direction and is connected with the second mounting plate, the at least two clamping jaws are slidably connected with the first connecting rod, the second connecting rod and the third connecting rod are connected with the third driving member and are spaced from each other in the second direction, each of the second connecting rod and the third connecting rod is connected with one of the at least two clamping jaws, the third driving member is configured to drive the second connecting rod and the third connecting rod to move towards each other to cause the at least two clamping jaws to move along the first connecting rod to clamp the workpiece.

14. The film-removing apparatus of claim 13, wherein the second mounting plate defines an opening, opposite ends of the first connecting rod are connected with opposite side walls of the opening.

15. The film-removing apparatus of claim 1, wherein a flexible layer is disposed on a side of the second peeling member facing the workpiece.

* * * * *